(12) United States Patent
Guemmer (10) Patent No.: US 8,192,148 B2
(45) Date of Patent: Jun. 5, 2012

(54) FLUID RETURN IN THE SPLITTER OF TURBOMACHINES WITH BYPASS-FLOW CONFIGURATION

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1120 days.

(21) Appl. No.: 11/896,151

(22) Filed: Aug. 30, 2007

(65) Prior Publication Data

US 2008/0232960 A1 Sep. 25, 2008

(30) Foreign Application Priority Data

Aug. 31, 2006 (DE) .......................... 10 2006 040 757

(51) Int. Cl.
*F01D 9/02* (2006.01)
*F01D 25/24* (2006.01)
(52) U.S. Cl. ........................................ 415/145; 415/144
(58) Field of Classification Search .................. 415/144, 415/145, 58.4, 58.5
See application file for complete search history.

(56) References Cited

U.S. PATENT DOCUMENTS

| | | | | |
|---|---|---|---|---|
| 3,638,428 | A * | 2/1972 | Shipley et al. | 60/226.1 |
| 4,047,379 | A | 9/1977 | Brookes et al. | |
| 4,783,026 | A | 11/1988 | Rumford et al. | |
| 6,325,595 | B1 * | 12/2001 | Breeze-Stringfellow et al. | 415/144 |
| 6,561,760 | B2 | 5/2003 | Wadia et al. | |
| 6,802,691 | B2 * | 10/2004 | Chlus | 415/145 |
| 7,077,623 | B2 | 7/2006 | Guemmer | |
| 2003/0035719 | A1 * | 2/2003 | Wadia et al. | 415/145 |
| 2005/0226717 | A1 | 10/2005 | Xu | |
| 2006/0104805 | A1 * | 5/2006 | Gummer | 415/58.5 |
| 2006/0153673 | A1 | 7/2006 | Guemmer | |
| 2009/0148273 | A1 * | 6/2009 | Suciu et al. | 415/159 |
| 2009/0232636 | A1 | 9/2009 | Grauer | |

FOREIGN PATENT DOCUMENTS

| | | |
|---|---|---|
| DE | 102005052466 | 5/2007 |
| EP | 0719908 | 7/1996 |
| EP | 1382855 | 1/2004 |
| EP | 1659293 | 5/2006 |
| GB | 2406139 | 3/2005 |

OTHER PUBLICATIONS

European Search Report dated Feb. 27, 2008 from counterpart foreign application.
German Search Report dated Aug. 31, 2006 from counterpart foreign application.
European Patent Office Action dated Aug. 31, 2009 from counterpart foreign application.

* cited by examiner

*Primary Examiner* — Edward Look
*Assistant Examiner* — Jesse Prager
(74) *Attorney, Agent, or Firm* — Timothy J. Klima; Shuttleworth & Ingersoll, PLC (57) ABSTRACT

A turbomachine, includes an annular flow duct, which downstream of at least one stage, is divided into an outer annular bypass duct and an inner annular core-flow duct via a concentrically arranged splitter, wherein the splitter is designed as an intermediate casing with at least one inner volume, through which fluid may be returned between core-flow stages.

14 Claims, 9 Drawing Sheets

PRIOR ART

Fig. 2b

PRIOR ART

FLUID RETURN IN THE SPLITTER OF TURBOMACHINES WITH BYPASS-FLOW CONFIGURATION

This application claims priority to German Patent Application DE102006040757.1 filed Aug. 31, 2006, the entirety of which is incorporated by reference herein.

The present invention relates to turbomachines with bypass-flow configuration, which may be used, for example, in blowers, compressors, pumps and fans of the axial and semi-axial type, the working medium (fluid) of which may be gaseous or liquid. The turbomachine includes several stages. Each stage comprises a rotor and a stator. The rotor features a number of blades which are attached to the rotating shaft of the machine and supply energy to the working medium.

The rotor may be shrouded or shroudless at the outer blade end. The stator includes a number of stationary blades, which may feature a fixed or a free blade end on the hub and on the casing side. Rotor drum and blading are enclosed by a casing. The machine may be provided with a stator upstream of the first rotor (inlet guide vane assembly).

The turbomachine features a bypass-flow configuration such that the single-flow annulus behind one of the blade rows is divided into two concentric annuli, each of which accommodates at least one further blade row.

More particularly, the present invention relates to a turbomachine provided with a bifurcation of the annulus (flow path) behind the first stage or behind a further downstream stage at which the main flow is divided into a core flow and a bypass flow by an essentially concentrically arranged splitter with lip-type leading edge.

For certain applications, turbomachines are designed such that the total fluid flow delivered, upon passing one or more blade rows, is divided into two smaller, separately conducted flows. These two flows are referred to as core flow (inside) and bypass flow (outside).

Figure 1:
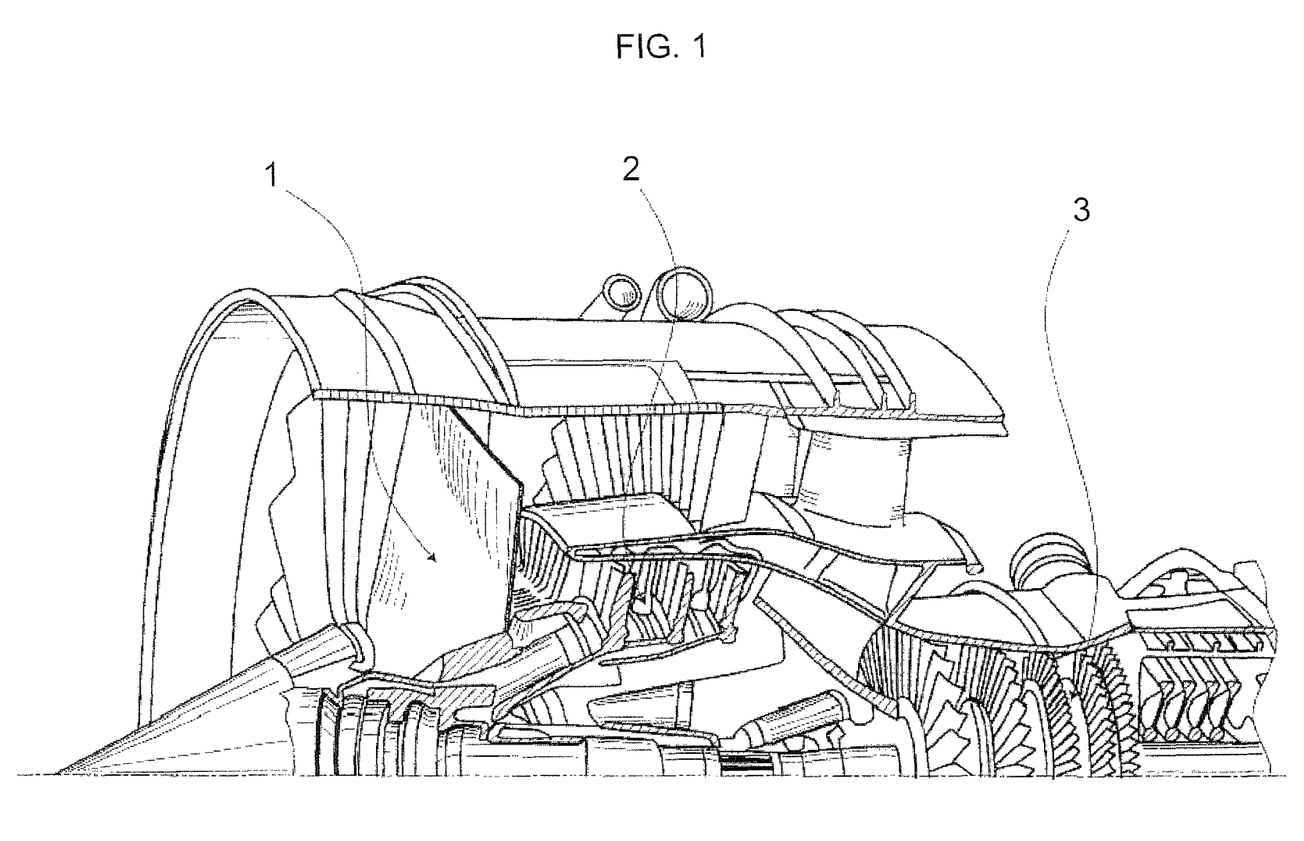

FIG. 1 (Prior Art) exemplifies the low-pressure compressor system of a modern commercial two-shaft engine, having a fan 1 (1 stage), booster 2 (3 stages) and high pressure compressor 3, (10 stages). The mass flow is usually divided in the low-pressure compressor section downstream of the rotor or stator of the last fan stage. The fan 1 can be of the one-stage or the multi-stage design.

Figure 2A:
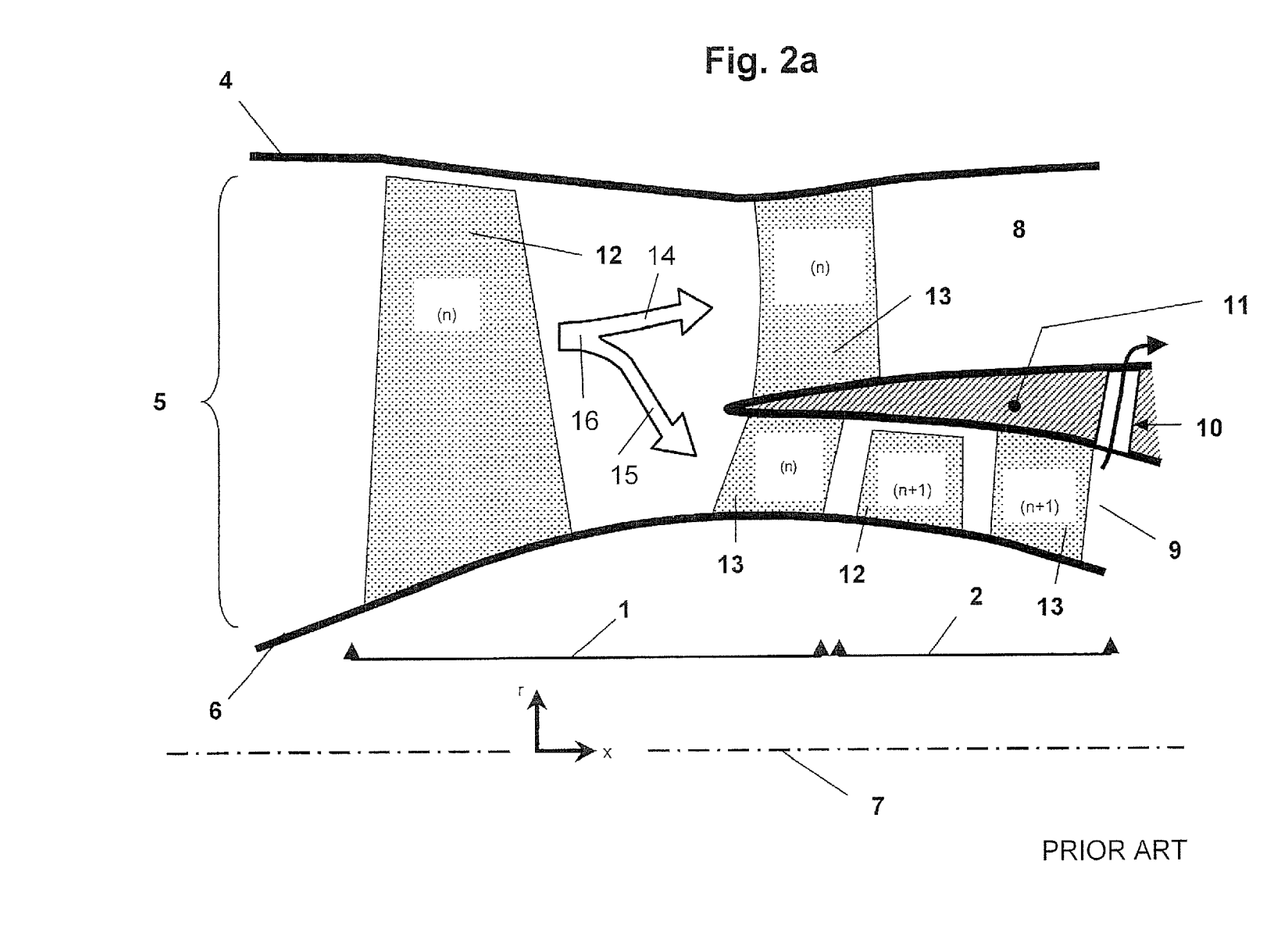
Figure 2B:
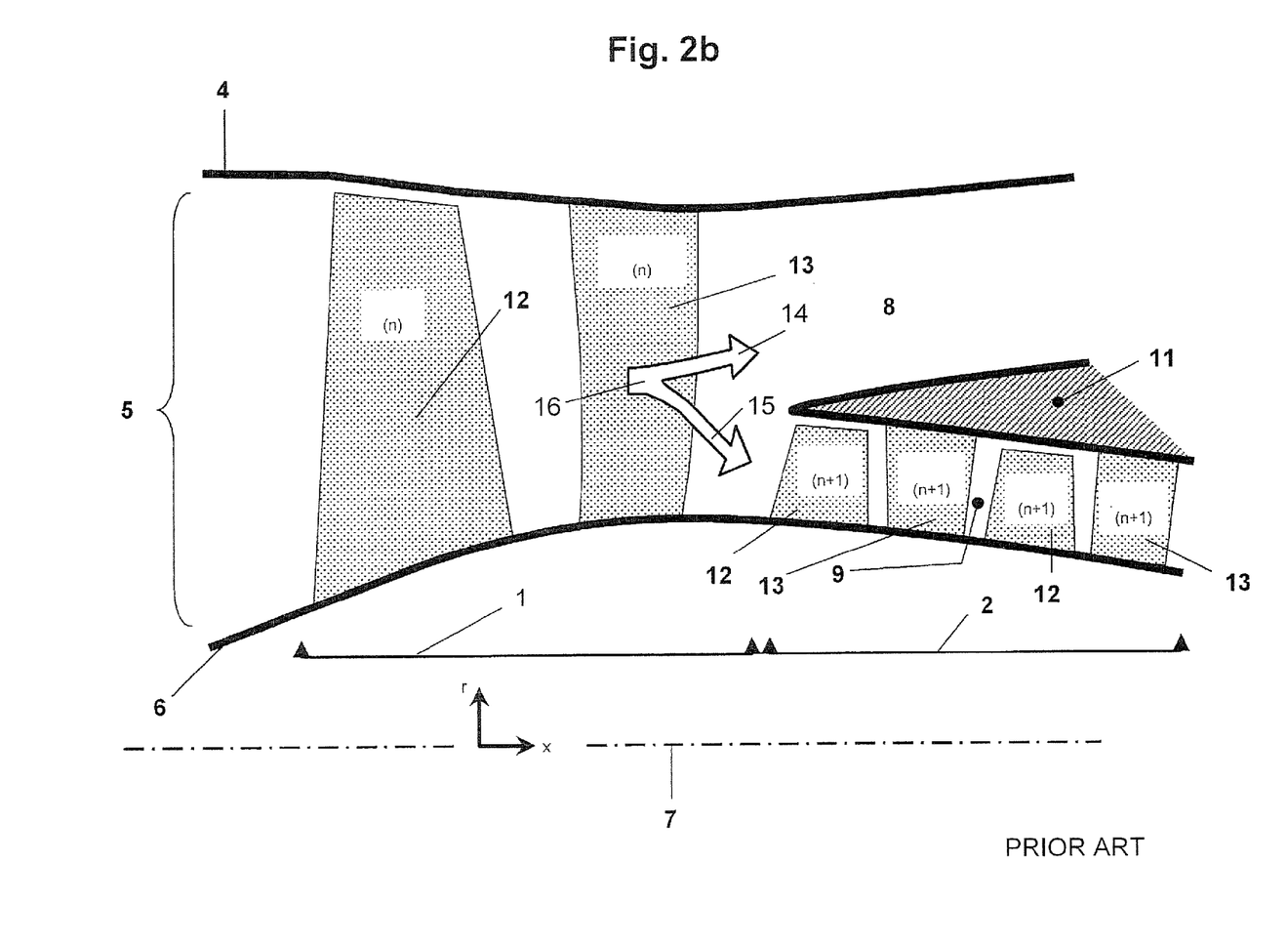

FIGS. 2a (Prior Art) and 2b (Prior Art) show two typical bypass-flow configurations on the example of the low-pressure compressor section of a two-shaft engine of a higher thrust class. The turbomachine has a ring duct 5 formed between housing 4 and hub 6, through which a total air flow 16 passes. Characteristic here is that the low-pressure compressor section is provided with one or several booster stages 2 immediately downstream of the appertaining core-flow stator 13.

An essentially rotationally symmetric splitter 11 provides for division of the total flow 16 into core flow 14 and bypass flow 15. The splitter 11 extends partly or entirely over the booster stages. At the splitter 11, the components situated in the core and bypass flow are mechanically connected. Thus, cavities are created within the splitter 11 which, however, are rarely utilized in the state of the art for conduction of fluid flows.

As can be seen in FIG. 2a (Prior Art), a radially outward passage 10 through the splitter 11 from the core flow 15 in core flow duct 9 to the bypass flow 14 in bypass duct 8 may be provided in the state of the art to bleed larger quantities of bleed air in part-load operation. FIG. 2b (Prior Art) shows an alternative, less common design of the low-pressure compressor, in which the division into core flow 15 and bypass flow 14 is not made upstream of the fan rotor, but only immediately upstream of the first booster stage.

Figure 3:
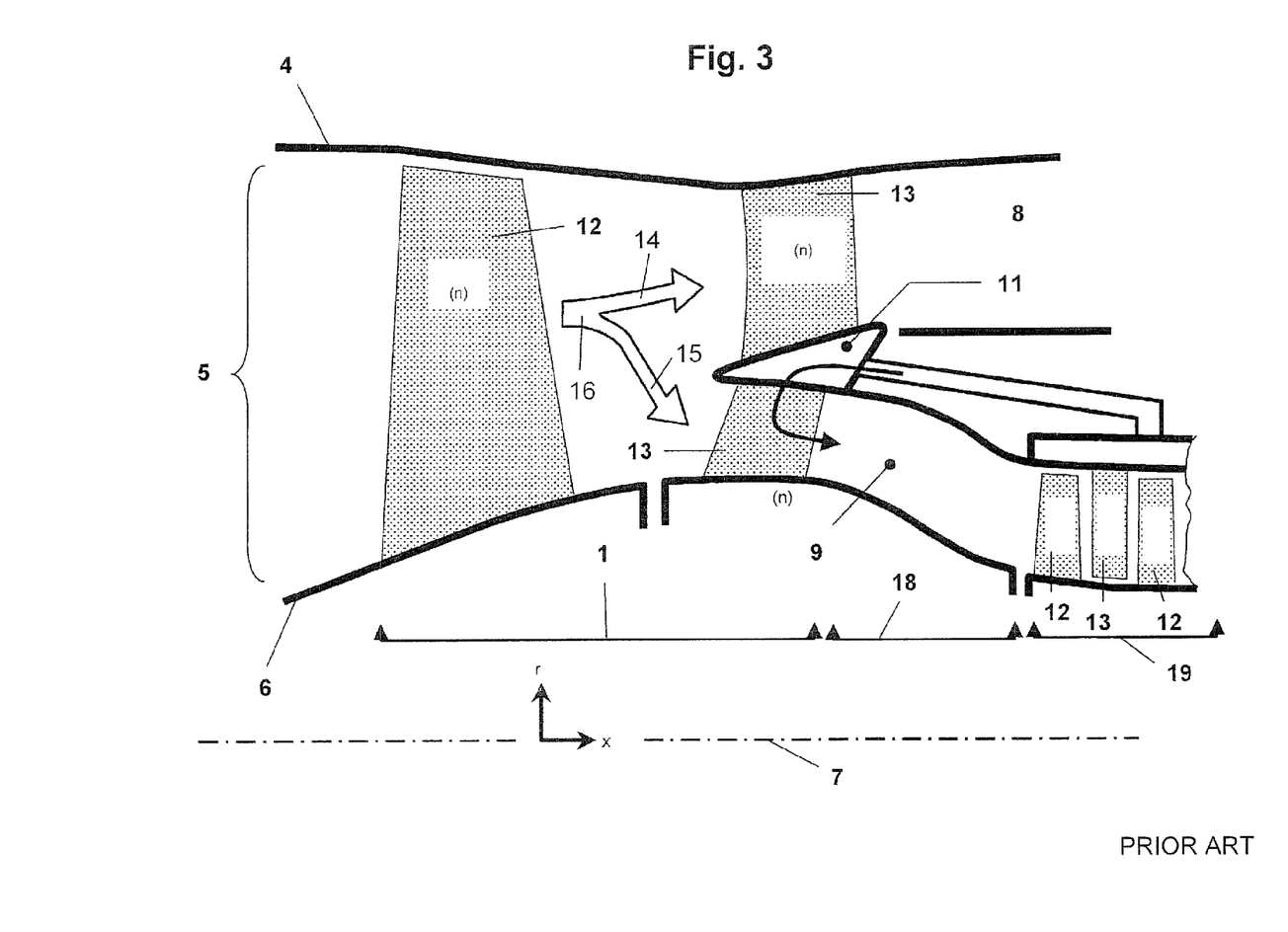

As shown in FIG. 3 (Prior Art), a chamber situated in the splitter 11 is in the state of the art provided in the area of the core-flow stator 13 downstream of the fan 1 in three-shaft engines which is supplied via a line with hot air from the further downstream intermediate-pressure compressor 19. The hot air is at times supplied to the hollow core-flow stator 13 for de-icing. This arrangement is characterized in that the core-flow stator 13 is not immediately followed by a compressor stage, but by an unbladed curved transition duct (CTD) 18. This is then followed by the intermediate-pressure compressor (IPC) 19, which is a separate module arranged further downstream and having its own shaft. The core-flow stator 13 is of the hollow type and has openings through which hot air may be discharged into the main-flow path.

The booster stages typical for two-shaft engines are externally separated from the splitter 11 against the bypass flow 14 (see FIGS. 2a (Prior Art), 2b (Prior Art)) and run on a common shaft with the fan, i.e. with very low blade velocity. Consequently, under current aerodynamic loadability provisions, the booster stages are capable of providing only small stage pressure ratios. In order to obtain adequately high pre-compression for the work cycle, a great number of booster stages are required in the state of the art which, in addition to consuming considerable installation space, contribute to a high weight of the engine.

A method for increasing the obtainable stage pressure ratios, which is generally applicable to all turbomachines, is to actively influence the flow by fluid supply/discharge at the surfaces of the blading and/or the annulus. However, this method normally requires considerable additional effort with regard to the design of the casing, which in this case must be of the two-shell design, to accommodate flow paths for the conduction of the secondary fluid quantities.

The design of the stages situated in the core flow of turbomachines with bypass-flow configuration, hereinafter sometimes referred to as booster stages (as for the two-shaft engine), is governed, according to the state of the art, by low aerodynamic loading since booster stages require a disadvantageously wide stability margin to ensure safe operation of the engine. The high requirement on stability margin is partly due to the fact that the mass-flow capacity of the booster stages is not variable without changing speed. Remedy is normally found by provision of a large air bleed point and the appertaining, costly actuating mechanism. In addition, the high number of the booster stages required adversely affects the overall length and the weight of the entire machine (e.g. engine).

The cavity genuinely existing in the splitter between core flow and bypass flow, which, entirely or partly, envelops the booster stages, is, conceptually and aerodynamically, not employed in this single-shaft turbomachine design for circulation of secondary fluid flows between various blade rows of the stages enclosed by the splitter, i.e. for effecting active boundary layer control on the blading.

A broad aspect of the present invention is to provide a turbomachine of the type specified above, which uses the splitter for secondary fluid conduction inside the turbomachine.

According to the present invention, the splitter is used as intermediate casing for at least one stage of the turbomachine arranged immediately downstream of the first core-flow stator and, in the area of these core-flow stages (booster stages) enclosed by the splitter, flow paths and/or chambers are provided in the interior of the splitter which enable secondary fluid to be conducted between locations on the main flow path within the bladed space of various blade rows of the core flow and/or the bypass flow. The splitter can additionally house at least one switchable valve to control or at times interrupt one or more secondary fluid flows.

Thus, the present invention enables the boundary layers within the bladed space of at least one blade row to be simply and efficiently influenced, with the effect that higher aerodynamic loadability and greater compactness of the stages in the core flow are achievable, and with the further effect that control of the secondary fluid flows via a switchable valve, in particular by influencing the blade efflux direction, enables the mass-flow capacity of the respective stages to be varied.

The present invention is more fully described in the light of the figures, showing preferred embodiments. In the drawings, FIG. 1 (Prior Art) is an example of a turbomachine with bypass-flow configuration (low-pressure compressor of an aircraft engine of the medium thrust class), FIG. 2a (Prior Art) is an example of a turbomachine in accordance with the state of the art, low-pressure compressor of a two-shaft engine, fan with booster, FIG. 2b (Prior Art) is a further example of a turbomachine in accordance with the state of the art, low-pressure compressor of a two-shaft engine, fan with booster, FIG. 3 (Prior Art) is an example of a turbomachine in accordance with the state of the art, low-pressure compressor of a three-shaft engine, fan (without booster)

Figure 4A:
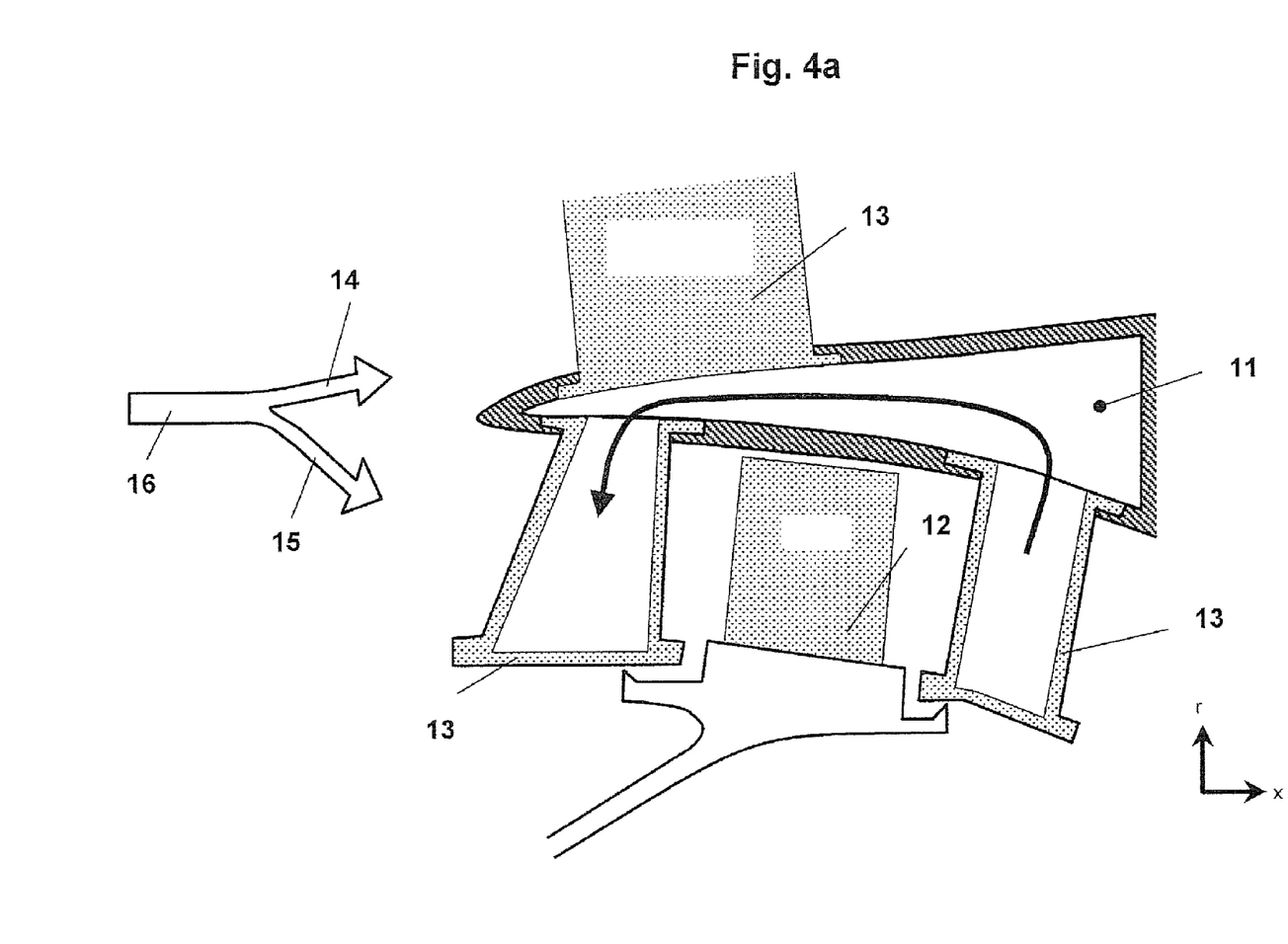
FIG. 4a shows an inventive use of the splitter for fluid conduction.

FIG. 4a shows the respective part of a turbomachine with bypass-flow configuration in meridional section, here schematically shown as an arrangement of the first core-flow stator and a core-flow stage consisting of rotor 12 and stator 13 arranged directly downstream. The figure exemplifies a design of the turbomachine according to the present invention, with the appertaining splitter 11 enclosing the core-flow stages. In accordance with the present invention, the splitter 11 is provided with flow paths in its interior through which fluid, for example via openings in the surface of the last stator, is removed from the main flow path and transferred in controlled manner to the first core-flow stator 13 where it is re-supplied to the main flow path. For clarity, only one core-flow stage is shown in the figure. The present invention, however, also relates to multi-stage arrangements. The inventive concept is not limited to the precise type and the precise location of fluid removal/fluid supply on the main-flow path, but to the feature of the turbomachine that the splitter 11 is employed for recirculation of small secondary fluid quantities and the associated fluid removal and fluid supply is provided within, or immediately upstream of, the bladed space (formed by the zone between the leading and trailing edge plane) of the respective blade rows 12, 13.

Figure 4B:
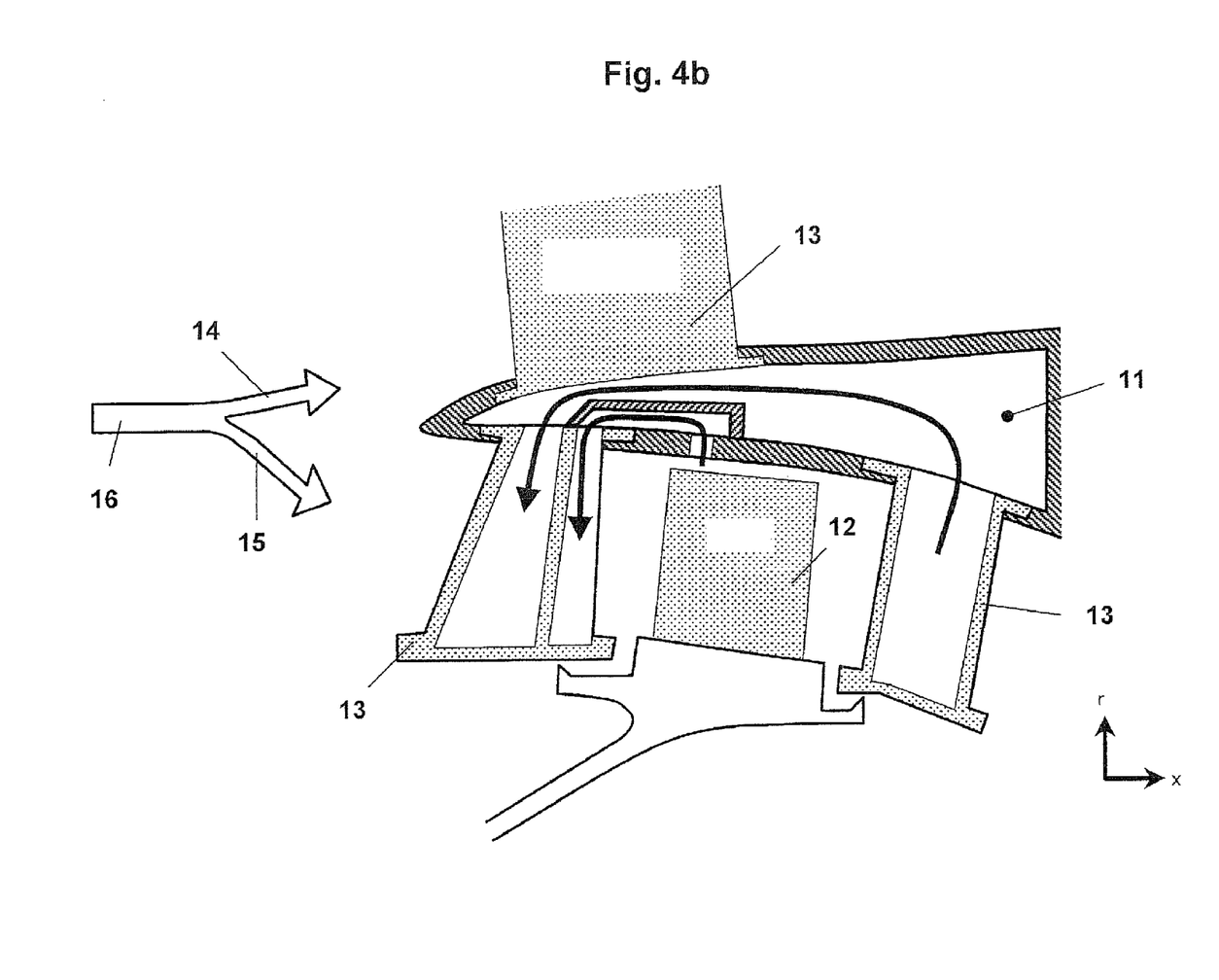
FIG. 4b shows a further inventive use of the splitter for fluid conduction.

FIG. 4b shows a further configuration of the turbomachine and the splitter 11 enclosing the core-flow stages according to the present invention. In the example shown, the splitter 11 is divided into several chambers of which the one, as in FIG. 4a, provides for recirculation from the rearward to the forward core-flow stator 13, while the other is additionally used for fluid return from the radial gap zone of the rotor 12 to the trailing edge area of the forward core-flow stator 13. In accordance with this principle, differently designed divisions of the splitter interior may also be provided without leading to a new inventive concept.

Figure 4C:
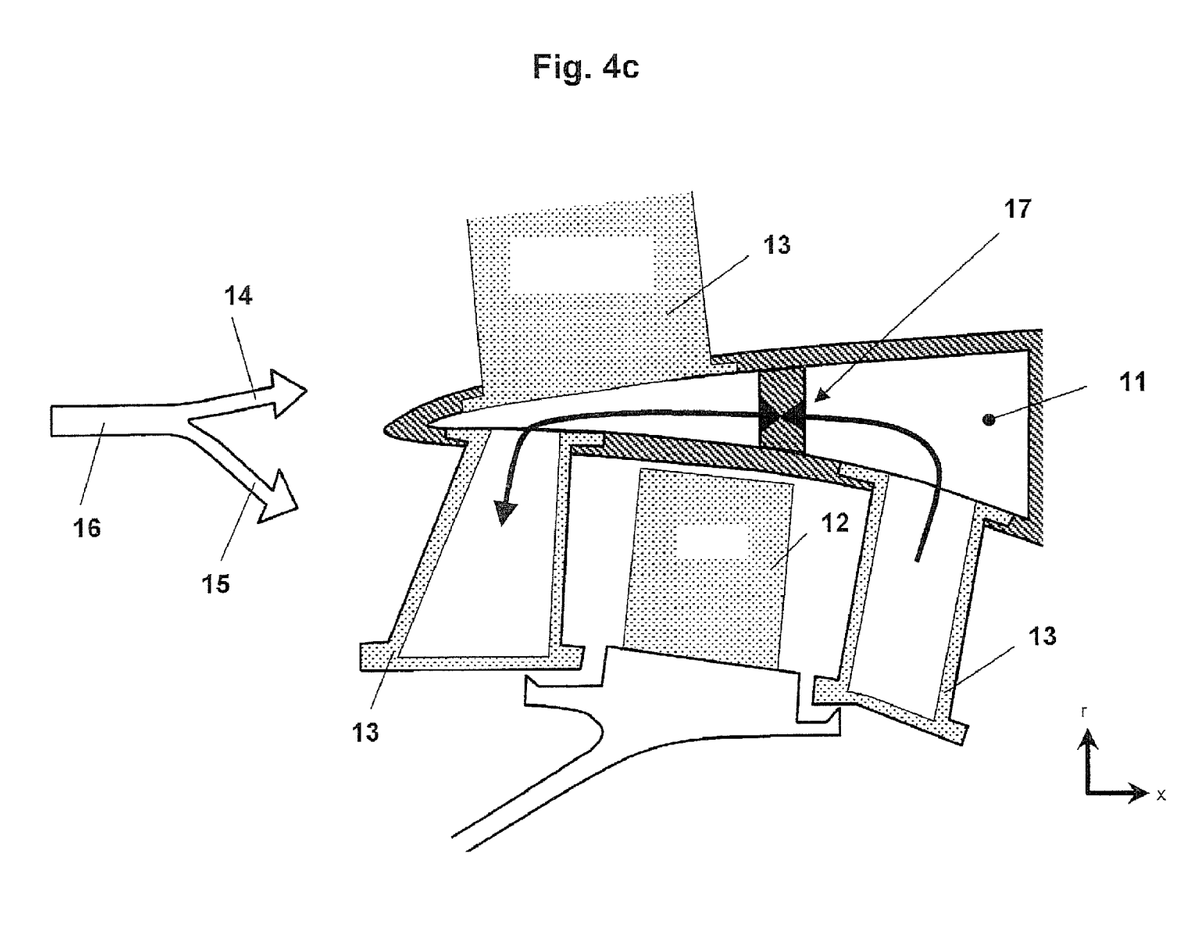
FIG. 4c shows a further inventive use of the splitter for fluid conduction.

FIG. 4c shows a further configuration of the turbomachine and the splitter enclosing the core-flow stages according to the present invention. In the example shown, the splitter 11 is divided into two chambers, which—in addition to the solution provided in FIG. 4a—are connected by a throttling element or a controllable valve 17. The throttling element/valve 17 is also housed within the splitter 11 and at times may interrupt the secondary fluid flow to change the operating behavior of the core-flow stage. For multi-stage arrangements in the core flow, multiple throttling elements/valves may in principle be provided according to the present invention.

Figure 4D:
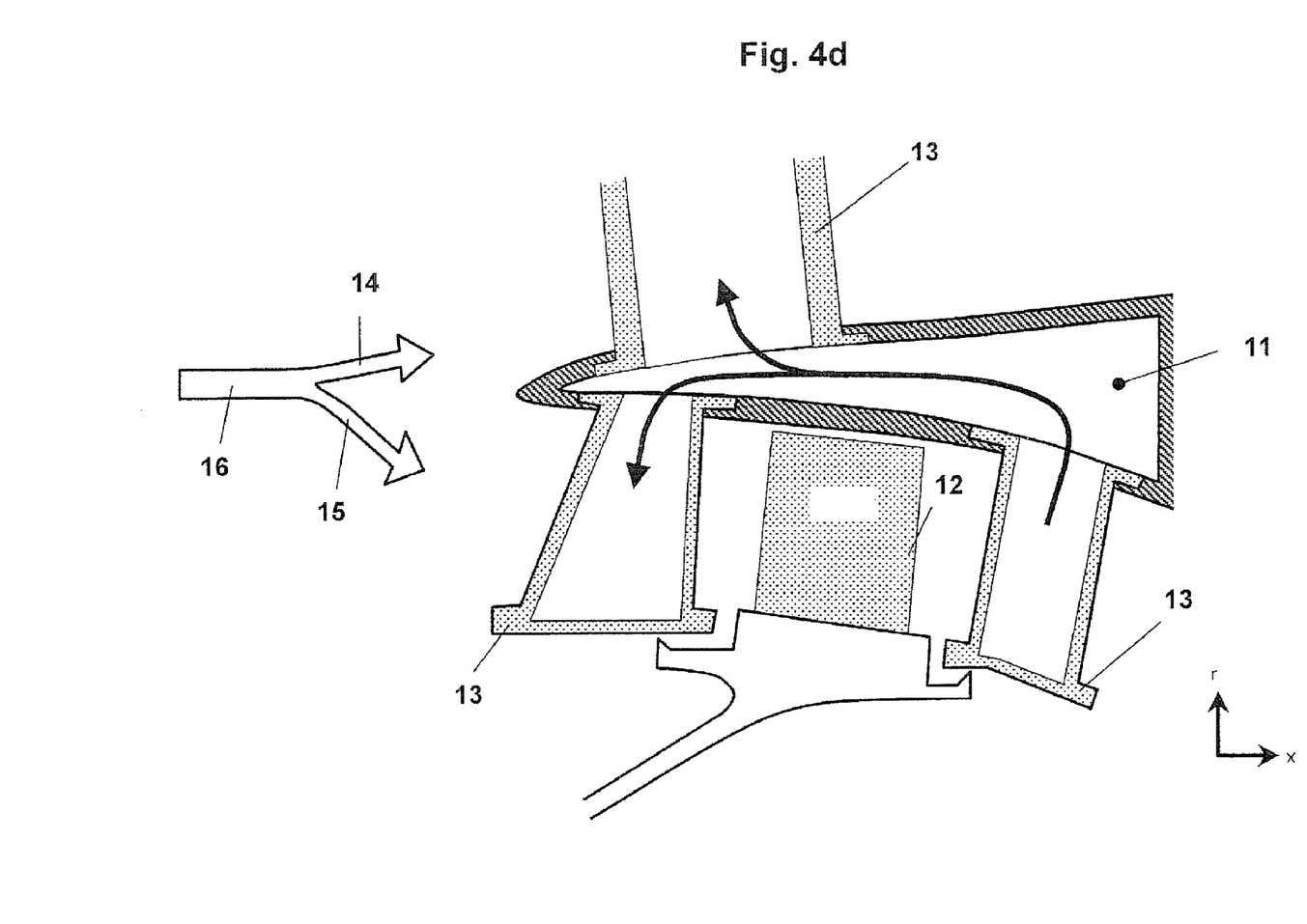
FIG. 4d shows a further inventive use of the splitter for fluid conduction.

FIG. 4d shows a further configuration of the turbomachine and the splitter enclosing the core-flow stages according to the present invention. The splitter 11 in this example, as already shown in FIG. 4a, has only a single chamber, but additionally supplies secondary fluid to the stator 13 in the bypass flow 14 in this example of the present invention.

Figure 4E:
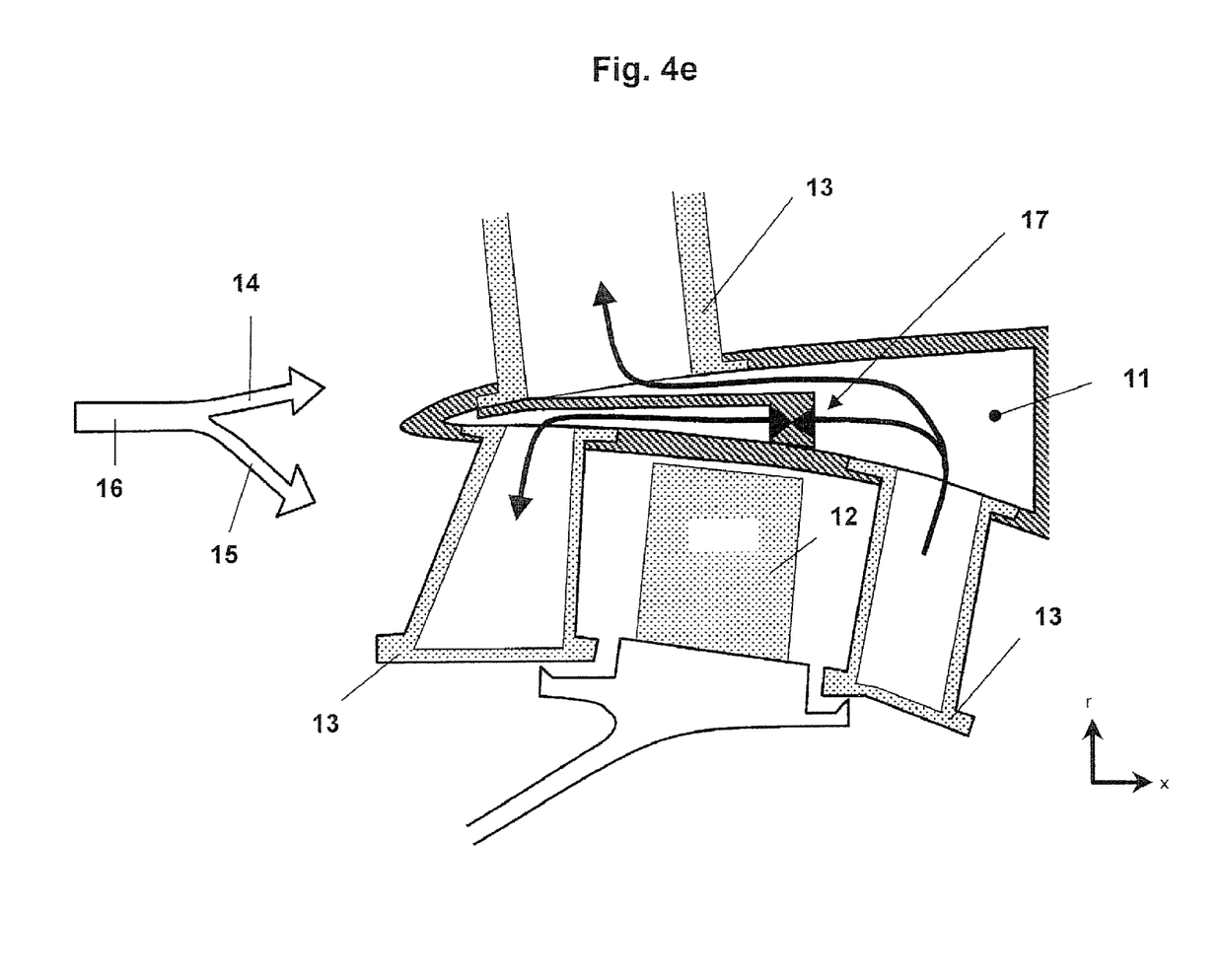
FIG. 4e shows a further inventive use of the splitter for fluid conduction.

FIG. 4e shows a further configuration of the turbomachine and the splitter 11 enclosing the core-flow stages according to the present invention. In the example shown, the splitter 11 is divided into two chambers, which—in addition to the solution provided in FIG. 4d—are connected by a throttling element or a controllable valve 17. The throttling element/valve 17 controls, in the case shown, the secondary fluid flow to the first core-flow stator but, in accordance with the present invention, may also be disposed at another location for controlling other secondary fluid flows in the splitter.

Fluid return in the splitter of turbomachines with bypass configuration as specified in the present invention provides, by simple means, for additional power concentration and compactness in turbomachines. In particular in the case of machines operating under the constraint of low speed, such as the booster stages of an aircraft engine enclosed by the splitter, an increase of loadability by the factor 2 is achieved. For a given pressure ratio of the booster stages, the number of components installed, as compared to conventionally designed boosters, can be reduced by at least 30 percent with efficiency being maintained or even improved by up to 2 percent. Cost and weight of the engine will be reduced by approx. 5%. If this concept is used in the compressor of an aircraft engine with approx. 25,000 pound thrust, a reduction of the specific fuel consumption of up to 0.5 percent is directly achieved. Further potential is provided by the reduced engine length and the possible reduction of the running gaps in the core engine sector (high-pressure compressor) resulting therefrom.

What is claimed is:

1. A turbomachine comprising:
   an annular flow duct;
   a splitter concentrically arranged in the annular flow duct downstream of at least one blade row to divide the annular flow duct into an outer annular bypass duct and an inner annular core-flow duct, wherein the splitter is designed as an intermediate casing with at least one inner volume through which fluid is returned by a first path connecting core-flow compressor stages of the core-flow duct;
   wherein, the at least one inner volume also provides a second path for secondary fluid conduction to at least one of locations within a bladed space of different blade rows of a bypass flow or locations within the bladed space of at least one blade row of the bypass flow.

2. A turbomachine in accordance with claim 1, wherein the inner volume is designed in the form of at least one chamber.

3. A turbomachine in accordance with claim 1, wherein the first path provides for the secondary fluid conduction between locations within a bladed space of different blade rows of the core flow.

4. A turbomachine in accordance with claim 1, wherein the inner volume of the splitter provides the second path for the secondary fluid conduction to the locations within the bladed space of different blade rows of the bypass flow.

5. A turbomachine in accordance with claim 1, wherein the inner volume of the splitter provides the second path for the secondary fluid conduction to and from the locations within the bladed space of the at least one blade row of the bypass flow.

6. A turbomachine in accordance with claim 1, and further comprising at least one of a switchable valve and a shut off element positioned in the inner volume of the splitter to control flow therethrough.

7. A turbomachine in accordance with claim 3, and further comprising at least one switchable throttling element positioned in the inner volume of the splitter to control flow therethrough.

8. A turbomachine in accordance with claim 7, and further comprising a plurality of inner volumes and flow paths formed by them, selectively capable of communicating with one another.

9. A turbomachine in accordance with claim 8, wherein, via the plurality of inner volumes, the fluid return is provided from the core-flow duct to a location upstream of the core-flow duct.

10. A turbomachine in accordance with claim 1, and further comprising at least one switchable throttling element positioned in the inner volume of the splitter to control flow therethrough.

11. A turbomachine in accordance with claim 10, and further comprising a plurality of inner volumes and flow paths formed by them, selectively capable of communicating with one another.

12. A turbomachine in accordance with claim 11, wherein, via the plurality of inner volumes, a fluid return is provided from the core-flow duct to at least one of a location upstream of the core-flow duct and a location in the bypass-flow duct.

13. A turbomachine in accordance with claim 1, and further comprising a plurality of inner volumes and flow paths formed by them, selectively capable of communicating with one another.

14. A turbomachine in accordance with claim 13, wherein, via the plurality of inner volumes, the fluid return is provided from the core-flow duct to a location upstream of the core-flow duct.

* * * * *